(12) United States Patent
Rodgers et al.

(10) Patent No.: US 11,649,328 B2
(45) Date of Patent: May 16, 2023

(54) CORE AND SHELL POLYMERS FOR 3D-PRINTING

(71) Applicant: JABIL INC., St. Petersburg, FL (US)

(72) Inventors: Luke Rodgers, St. Petersburg, FL (US); Erik Gjovik, St. Petersburg, FL (US)

(73) Assignee: JABIL INC., St. Peterburg, FL (US)

( * ) Notice: Subject to any disclaimer, the term of this patent is extended or adjusted under 35 U.S.C. 154(b) by 0 days.

(21) Appl. No.: 17/946,703

(22) Filed: Sep. 16, 2022

(65) Prior Publication Data

US 2023/0017838 A1 Jan. 19, 2023

Related U.S. Application Data

(63) Continuation of application No. 16/482,798, filed as application No. PCT/US2018/017344 on Feb. 8, 2018, now Pat. No. 11,447,629.

(60) Provisional application No. 62/456,482, filed on Feb. 8, 2017.

(51) Int. Cl.

| | |
|---|---|
| *C08L 69/00* | (2006.01) |
| *C08L 9/06* | (2006.01) |
| *C08L 25/06* | (2006.01) |
| *C08L 25/12* | (2006.01) |
| *C08L 33/08* | (2006.01) |
| *C08L 33/12* | (2006.01) |
| *C08L 61/16* | (2006.01) |
| *C08L 71/12* | (2006.01) |
| *C08L 79/00* | (2006.01) |
| *C08L 81/04* | (2006.01) |
| *C08L 81/06* | (2006.01) |
| *C08J 3/12* | (2006.01) |
| *B33Y 70/00* | (2020.01) |

(52) U.S. Cl.
CPC ............... *C08J 3/126* (2013.01); *B33Y 70/00* (2014.12); *C08L 9/06* (2013.01); *C08L 25/06* (2013.01); *C08L 25/12* (2013.01); *C08L 33/08* (2013.01); *C08L 33/12* (2013.01); *C08L 61/16* (2013.01); *C08L 69/00* (2013.01); *C08L 71/123* (2013.01); *C08L 79/00* (2013.01); *C08L 81/04* (2013.01); *C08L 81/06* (2013.01)

(58) Field of Classification Search
None
See application file for complete search history.

(56) References Cited

U.S. PATENT DOCUMENTS

2017/0361531 A1* 12/2017 Hasskerl ............... B29C 64/165

FOREIGN PATENT DOCUMENTS

WO    WO-2017003228 A1 *  1/2017  ............... C08J 3/12

OTHER PUBLICATIONS

WO2017003228A1 English Machine Translation prepared Nov. 22, 2021 (Year: 2021).*

* cited by examiner

*Primary Examiner* — Christopher M Rodd
(74) *Attorney, Agent, or Firm* — Thomas J. McWilliams; Barnes & Thornburg LLP (57) ABSTRACT

A core/shell polymer material suitable for three-dimensional printing is provided. The core/shell polymer material may include at least one amorphous polymer as a core particle and at least one semicrystalline polymer as a shell material surrounding the core particle.

15 Claims, 6 Drawing Sheets

| Core | Shell | Shell, Post Heating |
|---|---|---|
| ABS | PC | PC/ABS |
| ASA | PC | PC/ASA |
| PMMA | PC | PC/PMMA |
| SAN | PC | PC/SAN |
| PEI | PEEK | PEEK/PEI |
| PS | PPO | PPO/PS |
| PES | PPS | PPS/PES |

CORE AND SHELL POLYMERS FOR 3D-PRINTING

CROSS-REFERENCE TO RELATED APPLICATIONS

This application is a Continuation application based on U.S. application Ser. No. 16/482,798, filed Aug. 1, 2019, entitled "Core and Shell Polymers for 3D-Printing" which is a national stage application of International Patent Application PCT/US2018/017344, filed Feb. 8, 2018, entitled "Core and Shell Polymers for 3D-Printing" which claims priority to U.S. provisional application Ser. No. 62/456,482, filed Feb. 8, 2017, entitled "Core and Shell Amorphous Polymer for 3D Printing," which are hereby incorporated by reference.

BACKGROUND

Field of the Disclosure

The present disclosure relates to materials and methods of making same for additive manufacturing, and, more particularly, to pulverulent polymer particles each having a polymer core and a polymer shell that may be well suited for additive manufacturing applications.

Description of the Background

Additive manufacturing, such as three-dimensional printing (3D-printing), like FDM printing for example, constitutes a significant advance in the development of not only printing technologies, but also of product development, prototyping, and experimental capabilities. Capabilities of 3D-printing include forming physical objects of virtually any geometry. By way of non-limiting example, gears, sprockets, toys, models, prototypes, and countless other physical objects can now be built using a 3D printer.

Typically, an object to be built is first created as a 3D digitally-modeled image. Using common computer-aided design (CAD) software, the modeled image is virtually created. After that, the object model is virtually "sliced" into thin layers, which ultimately comprise instructions of how the model will be physically built by the 3D printer. This virtual "slicing" is useful because conventional methods of 3D-printing involve a print head that successively deposits material in thin layers according to the geometry of the modeled image based on the printing instructions for each layer. The physical object is then produced by depositing successive layers of material one on top of another, according to the layer-instructions, such as from bottom to top. The print head may be capable of depositing the heated material while moving in multiple linear directions, while the base moves in three-dimensions. The print head continues depositing the material until the top, or last, layer of the object is reached and the object is thus fully formed.

Numerous methods of powder based 3D-printing have been developed. Selective laser sintering (SLS) is a 3D-printing technique that uses a laser to fuse powder material on successive layers based on the geometry of the 3D model. High speed sintering (HSS) and Multi jet fusion (MJF) 3D-printing employ multiple jets that similarly deposit successive layers of IR absorbing ink onto powder material, followed by exposure to IR energy for selective melting of the powder layer. Electrophotography 3D-printing employs a rotating photoconductor that builds the object layer-by-layer from the base.

SLS, MJF, and HSS 3D-printing generally use a free floating, non-fixed, powder bed used for the production of an object. They share similar material requirements for compatibility with the printing process since the free body diagram of the additively built object will have the same stresses applied, only with different heating mechanism to obtain the melt phase. The free body diagram of a 3D printed object can be used to determine the residual stresses expected in the object. If a residual stress is too high, the object may deform into the printing region and be displaced in the part bed by the printing processes such as the powder deposition blade or roller.

In general, to obtain the lowest amount of residual stress in a free floating powder bed, both the elastic modulus and the volumetric change of the molten phase should be suitably low. This facilitates that selectively molten areas do not induce large enough residual stresses into the object that it departs from a build plane. A process for addressing residual stresses for these powder bed-based 3D printers is to use a polymer with a sufficiently large operating window between its melting temperature and its recrystallization temperature. Therefore, keeping the molten region a low elastic modulus and uncrystallized minimizes large strain until the entire object is built. Unfortunately, few polymers have a broad enough window between the two aforementioned phase transitionals to allow the SLS, HSS, and MJF processes to build the object with a low desirably residual stress.

Thus, when selecting 3D-printing materials the breadth of the operating window is a significant process parameter. Physical characteristics of a suitable polymer include a melting temperature that is higher than its recrystallization temperature, and a suitability for effective localized melting. It is, therefore, gap size between the melting point and the recrystallization temperature of the polymer that forms a suitable operational window to better allow for polymer printing in SLS, HSS, and MJF 3D-printing systems. To expand the range of available usable materials in these printing systems, the physical properties of the polymers, and processes that may change their physical properties and expand the operating windows, must be considered.

Historically, there are a limited number of polymer materials suitable for use in powder-based 3D-printing. To qualify, a polymer is required to have a sufficiently large operating window between its melting temperature and its recrystallization temperature. Few polymers have a broad enough window between the two phase transitionals to allow the SLS, HSS, and MJF process to build the object with a low enough residual stress.

Many polymers lack an operating window between when they melt and when the polymer regains elastic modulus. One such category having limited use in powder-based 3D-printing is amorphous polymers. This includes but is not limited to, acrylonitrile butadiene styrene (ABS), acrylonitrile styrene acrylate (ASA), polymethyl methacrylate (PMMA), styrene-acrylonitrile (SAN), polyethylenimine (PEI), polystyrene (PS), and polyethersulfone (PES). These polymers do not have an operating temperature, at which both the powder does not agglomerate and the selectively molten polymer does not regain an elastic modulus that would induce residual stresses large enough to deform the part into the build plane. There are examples of commercially available amorphous materials, but they are run at low temperature, and produce very brittle, non-dense parts due to the operating temperature. These parts also require substantial anchoring support structures to keep them from deforming into the build plane.

SUMMARY

Disclosed Compositions, systems and methods according to certain embodiments of the invention employ amorphous, semicrystalline, and combinations thereof pulverulent polymers for use in SLS, HSS, MJF, and electrophotography powder-based 3D-printing applications.

An illustrative embodiment of the present disclosure may provide a core/shell polymer material suitable for use of additive manufacturing such as three-dimensional printing. Such a core/shell polymer may include: at least one amorphous polymer as a core particle; at least one polymer as a shell material surrounding the core particle; the shell polymer surrounding the core material having a higher transition glass temperature than the at least one amorphous polymer core; wherein, when the shell is heated above the Tg of the shell material, the core particle, which is already in its liquid phase, diffuses into the shell; and wherein the transition glass temperature of the shell material will lower due to alloying with the at least one amorphous polymer core particle.

In the above and/or other embodiments, the core/shell polymer material may further include: the object printed in an additive fashion not being subject to substantial residual stresses that deforms the object during build; the shell material being miscible with the core particle; the at least one amorphous polymer as the core particle being selected from the group consisting at least one of acrylonitrile butadiene styrene (ABS), acrylonitrile styrene acrylate (ASA), polymethyl methacrylate (PMMA), Styrene-acrylonitrile resin (SAN), polyethylenimine (PEI), Polystyrene (PS), and polyethersulfone (PES); the at least one amorphous polymer as the core particle being an amorphous thermoplastic polymer having the properties of ABS; the at least one amorphous polymer as the core particle being an amorphous thermoplastic polymer having the properties of ASA; the at least one amorphous polymer as the core particle being an amorphous thermoplastic polymer having the properties of SAN; the at least one amorphous polymer as the core particle being an amorphous thermoplastic polymer having the properties of PEI such as Polyetherimide the at least one amorphous polymer as the core particle being an amorphous polymer made from a monomer styrene having characteristics of Thermocol; the at least one amorphous polymer as the core particle being an amorphous polymer similar to polysulfone; the at least one semicrystalline polymer as a shell material surrounding the core particle being selected from the group consisting at least one of polycarbonate (PC), polyetherether ketone (PEEK), polyphenylene Oxide (PPO), and polyphenylene sulfide (PPS); the at least one semicrystalline polymer as a shell material surrounding the core particle being a thermoplastic polymer having similar characteristics to PEEK; the at least one semicrystalline polymer as a shell material surrounding the core particle being a thermoplastic polymer having similar characteristics to PPO; the at least one semicrystalline polymer as a shell material surrounding the core particle being a thermoplastic polymer having similar characteristics to PPs; the core/shell further comprises an increased operating window where characteristics include a wider range between the melting and recrystallization temperatures, a larger enthalpy upon melting, and low volumetric change during recrystallization; the core/shell particles soften at lower temperatures but do not fuse together until exposed directly to the heat source, such as the laser; the core/shell particles are sinterable from about room temperature to less than 270 degrees Celsius and do not suffer thermal degradation during the printing process; the at least one amorphous polymer as the core particle composes the bulk of the core/shell particle; the shell material holds the particle shape at an elevated temperature; recrystallization or solidification of the core/shell polymer does not occur within the operating window which means a printed object does not fully recrystallize or solidify until it is formed; the core/shell polymer is used in SLS, HSS, MJF, and electrophotography powder-based 3D-printing applications; when the core/shell polymer is heated above the Tg of the shell polymer, the core is already in liquid phase and will defuse into the shell polymer to cause the core and shell polymers to alloy which causes the overall Tg of the shell to lower; when the core shell polymer is heated above the shell polymer the core is sufficiently large enough, such that even if the shell does resolidify during the printing process, the total residual stresses applied to the part are low enough such that the part does not leave the build plane; the shell forms a thin wall; the core polymer and shell polymer are miscible with each other; the core polymer and shell polymer produce favorable cohesion properties between the particles; alloying the polymers lowers the temperature window such that the polymers will melt when subjected directly to a laser or IR heater, the core/shell particles are deposited in successive layers, one-on-top-of-another, without internal stresses being built up during cooling; an ABS amorphous polymer core encapsulated by a PC shell that forms a PC/ABS alloyed polymer shell upon heating; an ASA amorphous polymer core encapsulated by a PC semi-crystalline shell to form a PC/ASA shell alloy; a PMMA amorphous polymer core encapsulated by a PC semi-crystalline shell forming a PC/PMMA alloyed shell; a SAN amorphous polymer core encapsulated by a PC semi-crystalline shell to form a PC/SAN shell alloy upon heating; a PEI amorphous polymer core encapsulated by a PEEK semi-crystalline shell to form a PEEK/PEI alloyed shell; a PS amorphous polymer core encapsulated by a PPO semi-crystalline shell to form a PPO/PS alloy shell upon heating; a PES amorphous polymer core encapsulated by a PPS semi-crystalline shell to form a PPS/PES alloyed shell upon heating; optimizing the thickness of the shell versus the diameter of the core; obtaining a sufficient Tg from alloying the amorphous semicrystalline polymers; optimizing miscibility; optimizing the Tg values between the core and shell; and optimizing molecular weight.

Another embodiment of the present invention includes a method of making a core/shell polymer material suitable for three-dimensional printing. The method includes the steps of: placing the core polymer into a solution, suspension, or emulsion; adding a smaller quantity of shell polymer to a solvent; adding the core and shell solvents together forming a composition; agitating the composition to cause the shell material to adhere onto the core polymer particles; coagulating the composition out of solution; and polymerizing the shell onto the surface of the core.

In the above and other illustrative embodiments, the method may further comprise: the composition being re-precipitated, and the composition being mixed in different ratios or particle sizes.

BRIEF DESCRIPTION OF THE DRAWINGS

The exemplary compositions, systems, and methods shall be described hereinafter with reference to the attached drawings, which are given as non-limiting examples only, in which.

DETAILED DESCRIPTION

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "upon", "connected to" or "coupled to" another element or layer, it may be directly on, upon, connected or coupled to the other element or layer, or intervening elements or layers may be present, unless clearly indicated otherwise. In contrast, when an element or layer is referred to as being "directly on," "directly upon", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

Embodiments of the present invention relate to employing amorphous pulverulent polymers for use in SLS, HSS, MJF, and/or electrophotography powder-based 3D-printing applications. Such materials are previously known to generally be less suitable for such applications. An embodiment of the present disclosure provides employing an amorphous polymer as a core particle surrounded by a shell material having a higher transition glass temperature (Tg) than the amorphous core polymer. When the core/shell polymer is heated above the Tg of the shell polymer, it is believed the core (with its lower Tg) will already be in liquid phase and will defuse into the shell polymer. This will cause the core and shell polymers to alloy, which may cause the overall Tg of the shell to actually lower. This may lower the elastic modulus, which is useful for powder-based 3D printing. The result is an amorphous polymer suitable for use in a 3D-print application without internal stresses building up in the object during printing.

Another illustrative embodiment of the present disclosure may include a powdered polymer useful in SLS, HSS, MJF, and electrophotography 3D-printing applications. Each particle of the polymer may include a core material surrounded by a thin shell of a second polymer. The core polymer may have a lower Tg than the shell polymer. When sufficient heat is applied to begin melting the shell, the core polymer will already be melted. This may cause the core polymer to begin diffusing into the shell polymer. This polymeric diffusion or alloying is believed to lower the overall Tg of the particle, making it more conducive for powder-based 3D-printing. Particularly, alloying the polymers is believed to lower the temperature window that the polymers will melt. When subjected directly to a laser or IR heater, the core/shell particles can be deposited in successive layers, one-on-top-of-another, without undesirable high internal stresses being built up during cooling.

Employing such amorphous particles, with their higher elastic modulus, is believed suitable in powder-based 3D-printing, in accordance with embodiments of instant disclosure. The core/shell arrangement is believed to create a particle having a lower elastic modulus and a higher melting temperature than its resolidification temperature. Thus, when a portion of this core/shell polymer is directly subjected to an IR heater or laser, it may melt while the remaining adjacent polymer will not. The solid portion of core/shell material may thus serve as a supporting structure for the emulsified portion of the core/shell material. In addition to reducing the internal stresses in the object while cooling, the built up object is believed to not undergo a substantial volumetric change when cooling through the polymer's glass transition temperature. This is believed to be due to the core/shell polymer being substantially amorphous.

Employing amorphous powdered polymers as the core, and surrounding each powdered particle with a semicrystalline polymer shell, may result in a composition having a lower elastic modulus, lower volumetric change of the printed object, and that will maintain itself as a solid until directly subjected to an IR heat or laser. Additionally, the core polymer and shell polymer may be miscible with each other. This means that when heating the polymer to the point the shell begins to soften, the core is already liquefied and may diffuse into the shell. This diffusion may retard the crystallization kinetics of the semi-crystalline polymer, reducing the recrystallization temperature and the total amount of crystallinity formable in the shell. The larger volume of the core material will account for the majority of the volumetric characteristics of the selectively melted polymer, and as such have significantly lower elastic modulus than if the powder completely composed of the shell. It is further believed that, according to the Flory-Fox equation, for example, the Tg and elastic modulus of the core/shell polymer should lower. In addition, depending on the polymers chosen for the core and shell, favorable cohesion properties between the particles may be produced.

Such amorphous polymers that are may be used in certain embodiments of the invention as the core material may include acrylonitrile butadiene styrene (ABS), acrylonitrile styrene acrylate (ASA), polymethyl methacrylate (PMMA), Styrene-acrylonitrile resin (SAN), polyethylenimine (PEI), Polystyrene (PS), polycarbonate (PC), polyphenylene Oxide (PPO), polyetheylene terephthalate glycol (PETG) amorphous polyamides such as Polayamide 6-3-T and polyethersulfone (PES). Illustrative ABS polymers suitable for use in certain embodiments of the invention as a core material may include Cadon (Bayer), Cycolac (General Electric), Delta (GPC), Denka (Showa), Magnum (Dow), Novodur (Bayer), Royalite (Uniroyal), Tuerluran (BASF), and Toyolac (Toray). It is also appreciated that other common amorphous thermoplastic polymers having the properties of ABS may be included within the scope of this disclosure.

Another example of an amorphous polymer useful as a core material may include ASA polymers. Illustrative ASA polymers that may be used in certain embodiments of the invention include Centrex, (Monsanto), Lurans (BASF), and Geloy (General Electric). It is appreciated that ASA is similar to ABS and that other similar amorphous polymers may also be used according to embodiments of the invention.

Still another example of such amorphous polymers useful as a core material may include PMMA polymers. Illustrative PMMA polymers contemplated within embodiments of the invention include Acorylite (Evonik), Lucite (DuPont), R-Cast (Reynolds), Plexiglass (ELF APOCHEM), Optix (Plaskolite), Perspex (Imperial China Industries), Oroglas (Rohm & Haas), Altuglas (Rohm & Haas), Cyrolite (Cyro), and Zylar (Nova). It is appreciated that similar amorphous thermoplastic polymers may also be used.

Another example of amorphous polymers includes SAN polymers. Illustrative SAN polymers contemplated for use as a core may include Luran (BASF). It is appreciated that other similar amorphous copolymers having similar properties to SAN may also be used.

Still further examples of amorphous polymers include PEI polymers. Illustrative PEI polymers for use as a core may include Lucent PEI (A. Schulman), Arro-Lite (Azdel), Comco (Comco), Hydel (Ensinger), Tecapei (Ensinger), Inelect (Infinity), Luvocom (Lehman & Voss), Colorfast (Color Compounders), Lihan (Nanjing Lihan), Unitem (Nyteff), Poticon (Otsuka), Complete (Plasticomp), Dynapath (Polymer Dynamix), Pyramid (Polymics), Edgetek (PolyOne), Integra (Polysource), Duratoron (Quadrant), Ultem (Stratasys), Electrafill (Techmer), Titalon (Titan), Tynel (Tyne), and Tempalux (West Lake). Other amorphous polymers having similar properties to PEI may also be within the scope of this disclosure. To that end, it is further appreciated that any similar PEI polymers including Polyaziridine and Poly[imino (1,2-ethanedily)] may also be within the scope of this disclosure.

Another example of amorphous polymers include PS polymers. Illustrative PS polymers for use as a core may include Hiloy (A. Schulman), Arrolene (Aaron), Styron (American's Styrenics), Altuglas (Arkema), Neopor (BASF), Styrodure (BASF), Wyndform (CRP), Styrol (Denka), Aim (Dow), Hyrene (Entec), Vestyron (Evonik), Zylar (Ineos), Lucon (LG), Dylark (Nova), Edistir (Polimeri), Edgetek (PolyOne), Remak (SPS), Polystyrol (Styrolution), Hyfill (Techmer), Finaprene (Total Atofina), and Hips (West Lake). It is also appreciated that other amorphous polymers made from monomer styrene having the similar characteristics such as Thermocol™ may be used.

Such illustrative PC polymers contemplated within the scope of this disclosure may include Caliber™ (Dow), Lexan™ (General Electric), Makrolon™ (Bayer), Merlon™ (Bayer), Accucomp™ (A. Schulman), Anjacom™ (Almaak), Michlex™ (API Polymers), Desloy™ (Desco), Hydel TC™ (Ensinger), Tecanat™ (Ensinger), Hylex™ (Entec), and Ecogran™ (Eurocompound). It is appreciated that other similar thermoplastic polymers may also be used.

Still another example of amorphous polymers may include PPO polymers. Illustrative PPO polymers for use as the shell may include Noryl (Ensigner). It is appreciated that other thermoplastic polymers similar to PPO may be included.

Another amorphous polymer may include PES. Illustrative PES polymers contemplated may include Ultrason (BASF) and Sumitoly (Sumitomo). It is appreciated that other similar polysulfone amorphous thermoplastic polymers may also be included as a core material. Also included may be amorphous nylongs such as Evonik tragamide T500, EMS TR30, TR90. Also included is polyethylene terephthalate glycal-modified such as SK 2008 or PETG from, Eastman, and Huntsman.

Additionally, semicrystalline illustrative polymers may be suitable for use as part of the shell material may include polyetherether ketone (PEEK), Nylon 6, Nylon 6,10, Nylon 6,6, polyetheyelene terephthalate (PET), and polyphenylene sulfide (PPS).

Illustrative PEEK polymers suitable for use as the shell may include Tecapeek (Ensinger), Ketron (Quadrant), EMI (RTP), Aptiv (Victrex), Luvocom (Lehman & Voss), Thermocomp (LNP), Edgetek (PolyOne), Meldin (Saint-Gobain), Avaspire (Solvay), PEEK (West Lake), Zedex (Wolf Kunstoff). It is also appreciated that other thermoplastic polymer having similar characteristics to PEEK may also be used.

Illustrative PPS polymers suitable for use as the shell within the scope may include Tueder (Albis), Dic.PPS (Dic), Durafide (Poly Plastics), Ecotran (Schulman), Fortron (Celanese), Ryton (Solvay), and Torelina (Toray). It is appreciated that like the other shell polymers, any polymer having similar characteristics to PPS may also be used.

For purposes of this disclosure, an increased operating window includes the characteristics of at least one of a wider range between the melting and resolidification temperatures, a larger enthalpy upon melting, and low volumetric change during resolidification. By modifying the polymer's characteristics, its particles may soften at lower temperatures but not fuse together until exposed directly to the heat source, such as a laser. It is appreciated that these polymers may be sinterable from about room temperature to less than 240 degrees Celsius. With these Tg's and sinter temperature ranges it is less likely the polymers will suffer thermal degradation during the printing process, among other advantages.

As mentioned, in embodiments the core polymer has a lower Tg, than the shell polymer. The shell polymer is miscible with the core so that the core can diffuse into the shell once sufficiently heated. When the shell is heated above the Tg of the shell, the core, which is already in its liquid phase may diffuse into the shell. The Tg of the shell will then lower due to the alloying of the lower Tg material. This may create or enhance the operating window for additive manufacturing. This also enables an object to be printed in an additive fashion, without inducing residual stresses that deform the object during build.

Figure 1:
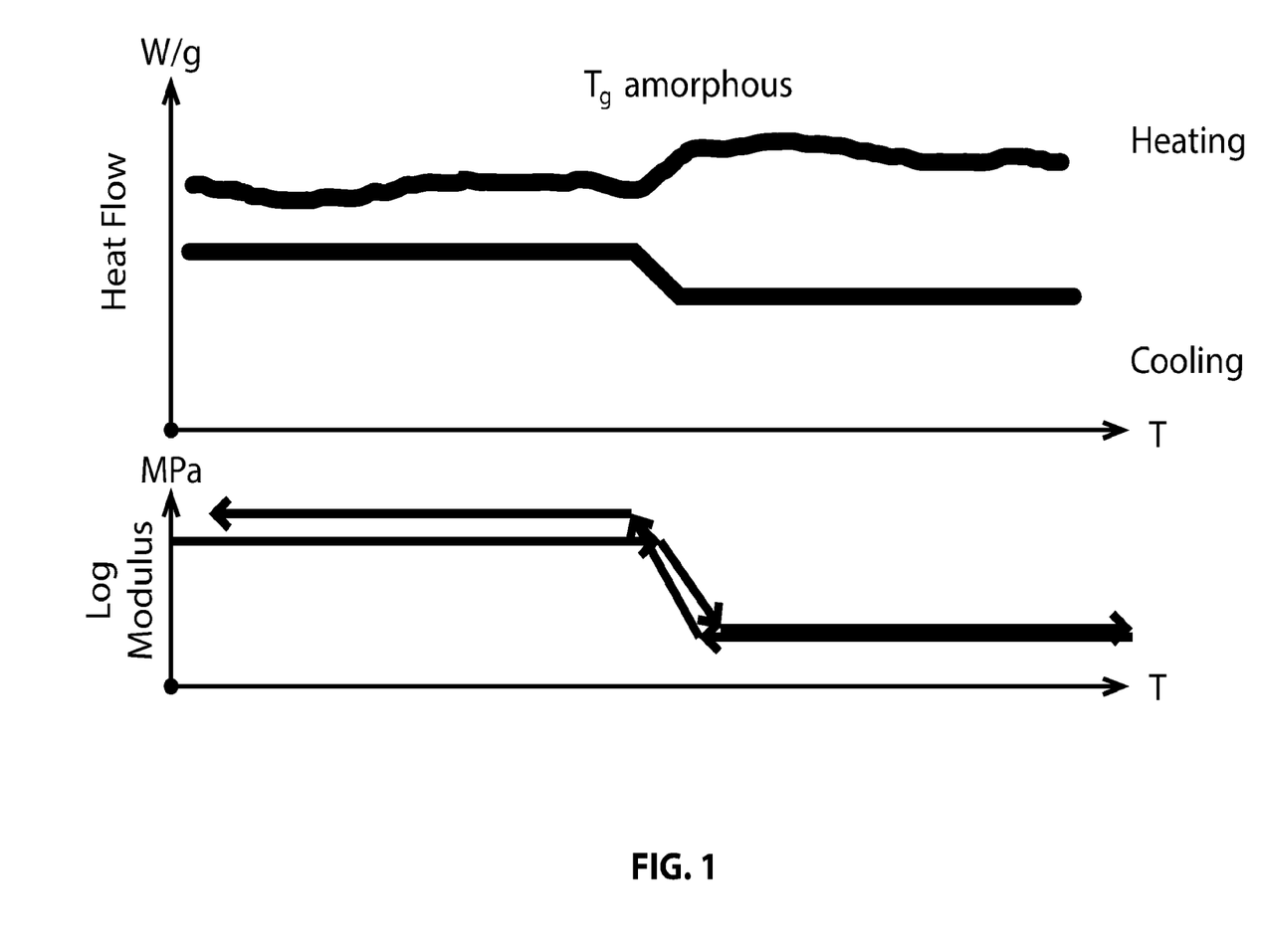
FIG. 1 shows a demonstrative differential scanning calorimetry and elastic modulus vs. Temperature graphs, respectively, of a noninventive amorphous polymer.

Demonstrative differential scanning calorimetry (DSC) and elastic modulus vs. Temperature graphs of an amorphous polymer is shown in FIGS. 1A and 1B. To be clear, these graphs do not represent actual data points but are believed to be approximate representative graphs for amorphous-type polymers. Accordingly, for a typical nonworking amorphous polymer, Tg upon heating and cooling may follow approximately the same line. There is no lower elastic modulus at a lower temperature while cooling. Without a low elastic modulus, amorphous polymers resolidify poorly making them poorly suited for production scale additive manufacturing, like 3-D printing techniques such as FDM techniques.

Figure 2:
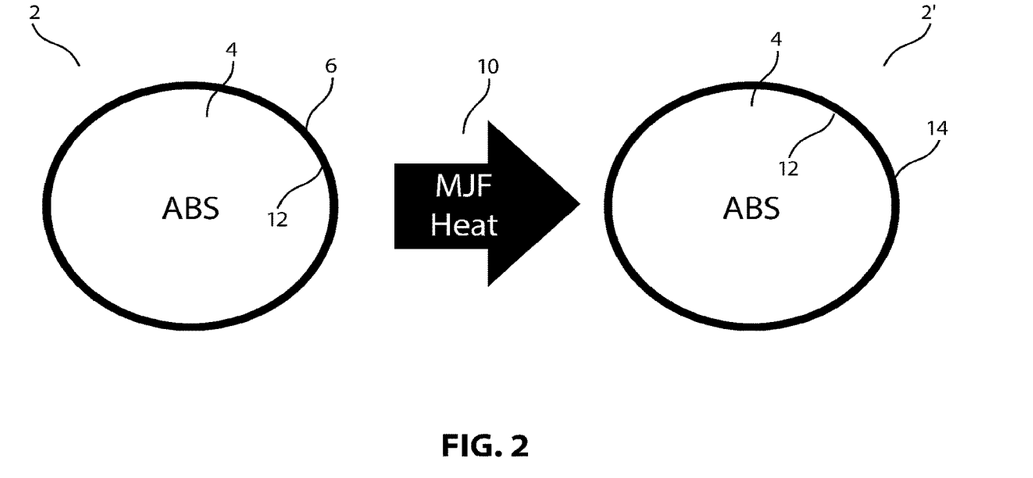
FIG. 2 is a demonstrative diagrammatic view of a core/shell polymer of the present disclosure.

According to the embodiments of the present invention, suitable core/shell polymers may include at least one amorphous polymer as the core, and at least one polymer as the shell at least substantially encapsulating the core. An illustrative diagrammatic view of a core/shell polymer 2 (unheated) and 2' (heated) is shown in FIG. 2. It is appreciated that quantities of these particles are aggregated to form a quantity of usable powder for the powder-based printing process. As shown, each particle 2 includes a core 4 that composes the bulk of the particle. It will be appreciated by the skilled artisan, in light of the discussion herein, that an advantage of embodiments of the present invention is that amorphous polymers are generally less expensive than semicrystalline counterparts. Accordingly, having a bulk of the material being a less expensive polymer may ultimately translate into lower material cost for additively manufacturing an object. Here, amorphous polymer 4 may take the form or include one or more of ABS, ASA, PMMA, SAN, PEI, PS, or PES, all by way of example. It is further appreciated that other amorphous polymers might be used as well.

Referring still to FIG. 2, polymer core 4 is encircled by shell polymer 6. Even though this diagrammatic view of particle 2 is cross-sectionally illustrated as circular, it should be appreciated the actual particle may be spherical and the coating or shell around this particle may likewise be shaped to at least partially encapsulate the particle. To that end, shell 6 is a thin layer of polymer that is formed around amorphous particle core 4. At a non-elevated (unheated) temperature, the amorphous polymer is distinct from the shell polymer. In other words, the shell can be thought of as a distinct coating on a core. The core polymer also has a lower Tg than the Tg of shell polymer. But when heat is applied, the characteristics of the polymers may change. For example, because the amorphous core polymer melts at lower temperatures than the shell polymer, the entire core/shell particle can be placed in a part bed, at a temperature lower than the shell polymers melting point and higher than the cores melting point. Leaving the core molten and the shell rigid. Further applying sufficient heat, such as the MJF heat represented by reference numeral 10 in FIG. 2, raises the temperature of the shell material, so that it is also molten. The shell and core polymers will then be free to diffuse with one another, alloying the shell material and therefore dropping the overall resolidification temperature of the shell. In certain embodiments the resolidification temperature is lower than the part bed temperature.

As represented by 2' in FIG. 2, this core/shell particle still at least substantially holds its form even though the applied heat 10 melts the amorphous polymer core 4. Compatible core/shell polymers used may be miscible (i.e., able to form a homogeneous mixture) with each other. This means that as the core polymer is melted and the shell polymer softens, core polymer 4 begins mixing with shell polymer 6 at boundary 12. By mixing these two polymers in this fashion, the particle of amorphous polymer is still in particle form that can be used in powder-based 3D-printing applications. This is because particle 2' has a shell 14 composed of a blend of amorphous and either a semicrystalline, or higher Tg amorphous polymer with the semicrystalline portions or higher Tg portions still holding the particle shape. Per the foregoing discussion, this results in a particle having a lower elastic modulus than the semicrystalline polymer above, as well as lower Tg, and lower volumetric shrink. But, the bulk of the polymer is still an amorphous polymer. As previously discussed, the combination of these characteristics may be conducive to powder-based 3D-printing applications.

Figure 3A:
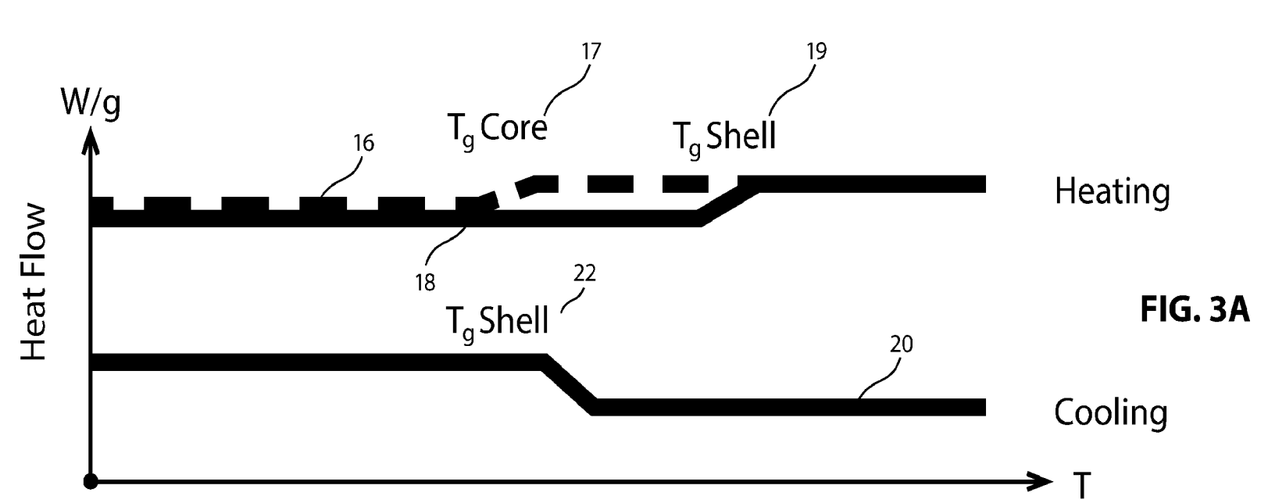
FIGS. 3A and 3B show demonstrative differential scanning calorimetry and elastic modulus vs. Temperature graphs that depict approximated characteristics the of a core/shell polymer according to the present disclosure.
Figure 3B:
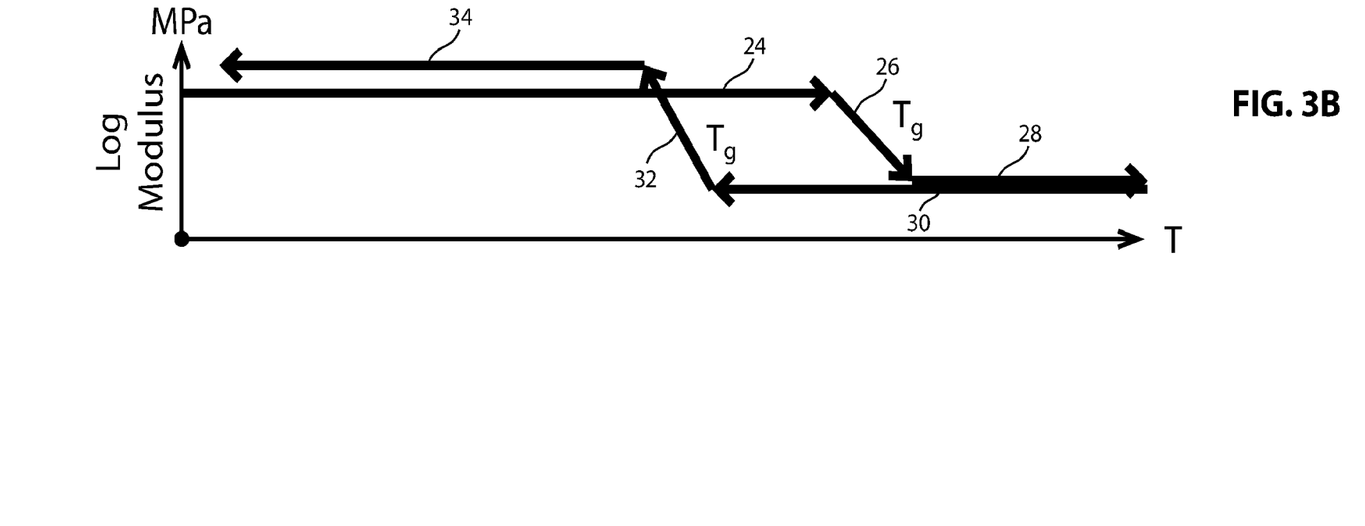

Illustrative DSC and Modulus vs. Temperature graphs of Core/shell 2 are shown in FIGS. 3A and 3B. It is appreciated that these graphs are also exemplary to demonstrate expected characteristics, but are not borne of a specific set of data. With regard to the DSC graph shown in FIG. 3A, when heating core/shell polymer 2, line 16, which represents core 4 from FIG. 2, demonstrates a lower Tg than shell 6, which is represented by line 18. This graphically depicts how core 4 melts at temperatures that shell 6 will not. During cooling, this graph also shows how the alloyed polymer, represented by 2' in FIG. 2, has a Tg, as indicated by reference numeral 22, that is between the Tg of core 4 at reference numeral 17 and the Tg of shell 6 at reference numeral 19. The elastic modulus versus temperature graph shown in FIG. 3B depicts the behavior of the alloyed shell of 2'. As temperature increases, represented by line 24, the elastic modulus decreases at the Tg of the shell as indicated by line 26, and is then melted as shown by line 28. During cooling as first indicated by line 30, a reduction in temperature still maintains the low elastic modulus (which translates into less strain during cooling) until the material has sufficiently cooled to reach its glass transition at line 32 which then increases the elastic modulus as shown, until it resolidifies and becomes solid again, represented by line 34.

Figure 4A:
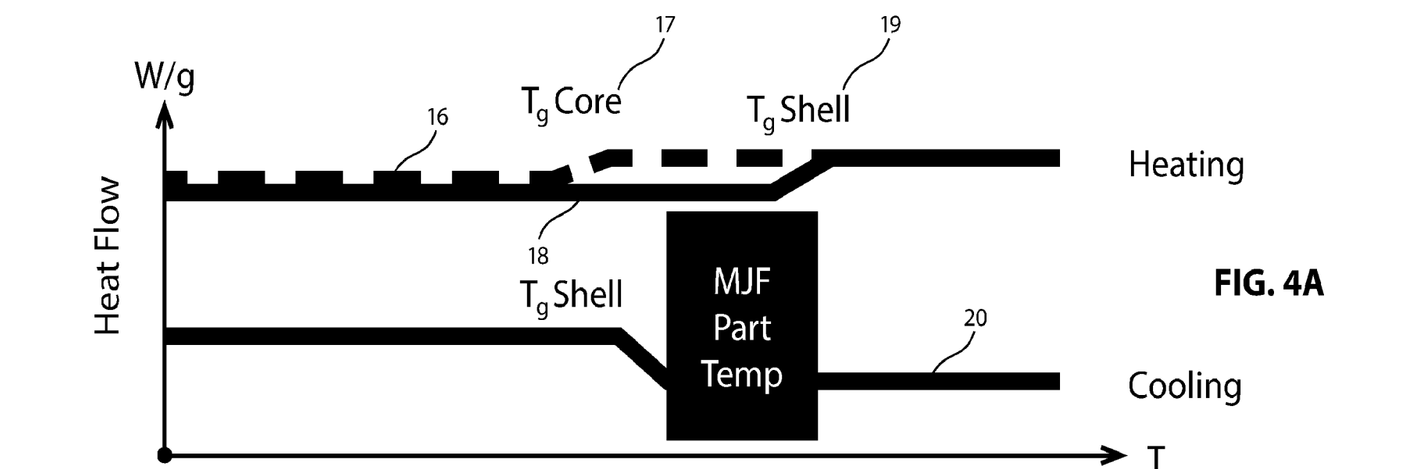
FIGS. 4A and 4B show the illustrative differential scanning calorimetry and elastic modulus vs. Temperature graphs of FIGS. 3A and 3B including an exemplary powder-based 3D-printing window.

Heat flow vs. temperature, as well as elastic modulus vs. temperature, graphs are shown adjacent each other in FIGS. 4A and B, respectively. These demonstrative graphs are similar to those shown in FIGS. 3A and 3B, respectively, except that here the operating window for powder-based 3D-printing application is identified. As shown in FIG. 4A, and like FIG. 3A, core 4 melts having a Tg indicated at reference numeral 17 along line 16 at a lower temperature than the Tg indicated at reference numeral 19 of shell 6 represented by line 18. Between the Tg of the shell when heated and the Tg of the shell alloy during cooling is a suitable operating window for powder-based 3D printing.

Figure 4B:
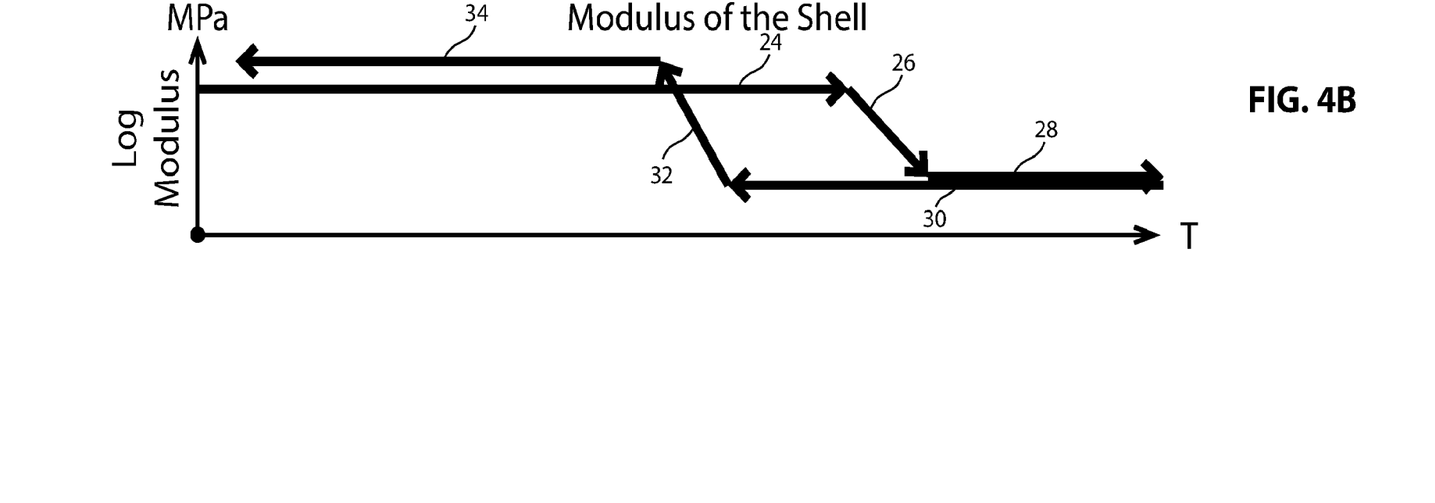

As shown, when cooling, the Tg of the shell alloy is lower than the operating window for the 3D-printing, which may be helpful during cooling. As shown in FIG. 4B, the temperature operating window for the 3D-printing process maintains the elastic modulus of the shell alloy. So long as the built object maintains the temperature within that window, the elastic modulus is not expected to increase. In sum, by employing an amorphous polymer having an outer shell applied thereon, each particle does not fully melt while in the temperature range usable for powder-based 3D-printing, which would otherwise occur if using only an amorphous polymer. And in addition, the resolidification does not occur within the operating window which means the object should not fully solidify until it is completely formed.

Figure 5:
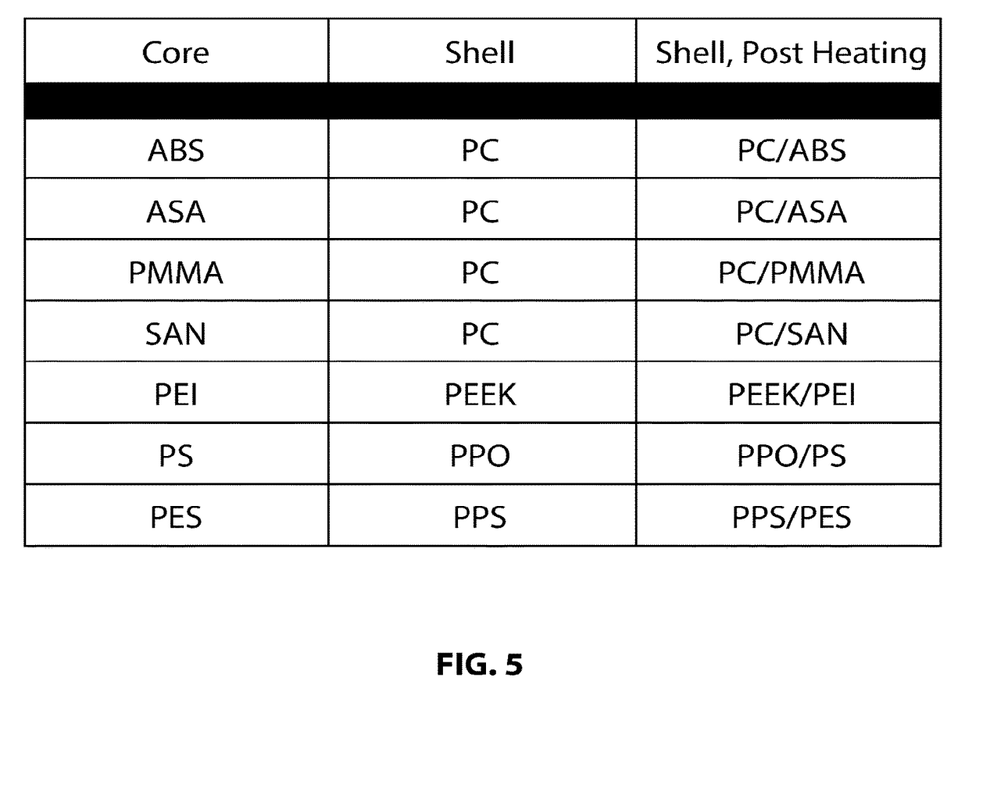
FIG. 5 shows a chart of the demonstrative core/shell polymer combinations.

The chart of FIG. 5 depicts illustrative combinations of core and shell materials that may be alloyed to produce a suitable 3D-printing powder. As depicted in this view, the first column is a list of amorphous polymers; the second column is either amorphous or semicrystalline polymers; and the third column is the alloyed core/shell polymer. For example, one illustrative embodiment of this disclosure includes an ABS amorphous polymer core encapsulated by a PC shell that forms a PC/ABS alloyed polymer shell upon heating. Another embodiment is an ASA amorphous polymer core encapsulated by a PC semi-crystalline shell to form a PC/ASA shell alloy. Another embodiment includes a PMMA amorphous polymer core encapsulated by a PC shell forming a PC/PMMA alloyed shell. Another illustrative embodiment includes a SAN amorphous polymer core encapsulated by a PC shell to form a PC/SAN shell alloy upon heating. Another illustrative embodiment includes a PEI amorphous polymer core encapsulated by a PEEK semi-crystalline shell to form a PEEK/PEI alloyed shell. Another embodiment includes a PS amorphous polymer core encapsulated by a PPO shell to form a PPO/PS alloy shell upon heating. Another illustrative embodiment includes a PES amorphous polymer core encapsulated by a PPS semi-crystalline shell to form a PPS/PES alloyed shell upon heating. It is appreciated that this is not the extent of the potential combinations or possibilities contemplated in the present disclosure. So long as the core and shell are compatible polymers with a Tg difference between the two where the shell has a higher Tg than the core, it is believed this process will be operable as disclosed.

It will be appreciated by a skilled artisan, in light of the discussion herein, that a component of developing the core/shell particle is optimizing the thickness of the shell versus the diameter of the core. On the one hand, the core needs to be sizable enough to supply the structure of the particle. Conversely, the shell needs to have some degree of thickness so the printing system can handle the polymer powder when it is near the operating window temperature. That said, the shell cannot be too thick because the overall particle's Tg may not lower sufficiently to obtain the desired operating window. For example, if 50% of the particle diameter is shell there will not be enough core to diffuse all the way to the exterior of the shell. This lack of alloying is what may prevent the Tg from lowering sufficiently. Obtaining a sufficient Tg from alloying the amorphous semicrystalline polymers is part of optimizing the relative core and shell sizes.

As far as selecting the core and the shell, miscibility, or how much each polymer is attracted to each other, is a factor. Polymers that are fully miscible have enthalpic drive to want to be into the other polymer. This miscible interaction may help diffusion, which may, in turn, help drop Tg of shell material. For example, combining polymethyl methacrylate having a Tg of about 105 degrees Celsius and a polycarbonate having a Tg of about 145 degrees Celsius at about a 50/50 ratio, may have a crystallization Tg of about 125 degrees Celsius. Semi-miscible polymers may be included as well. In at least some methods of manufacturing, miscibility may be useful to cause diffusion because the method may not include any stirring or agitation for certain powder systems. Blending may rely on the mobility of the polymers at 0-sheer and elevated temperature to promote diffusion.

In addition, the Tg values between the core and shell materials may have a substantive difference. It is believed that when the materials are miscible with each other and have a Tg separation gap, the Tg of the resulting polymer will drop essentially linearly based on the weight percent of each polymer system. Conversely, a small distance between the Tg's may mean a smaller reduction in the Tg of the shell even if alloying occurs. If the Tg of the core polymer is only slightly less that the Tg of the shell polymer, the core may not be able to diffuse enough into the shell to reduce the shell's Tg. Again, depending on the particular 3D-printing application, different polymers having different Tgs may be chosen based on the Tg separation gap between the polymers to create a desired result.

It is also believed molecular weight is a function of miscibility. Varying the molecular weight may result in either having full miscibility at low molecular weights, or zero miscibility at very high molecular weights. To have sufficient diffusion as the shell reaches its Tg, the amorphous core polymer needs to be at optimum molecular weight (or weights) to sufficiently diffuse into the shell polymer to lower its Tg.

Even expensive semicrystalline polymers for the shell material might be used to reduce cost. For example, polyetherimide, an amorphous high temperature polymer which is fully miscible with PEEK, may be used as a core. PEEK is very expensive. Using only a small amount as the shell for the polyetherimide may result in a polymer alloy that maintains the chemical resistance of PEEK but may still be cost-effective.

Figure 6:
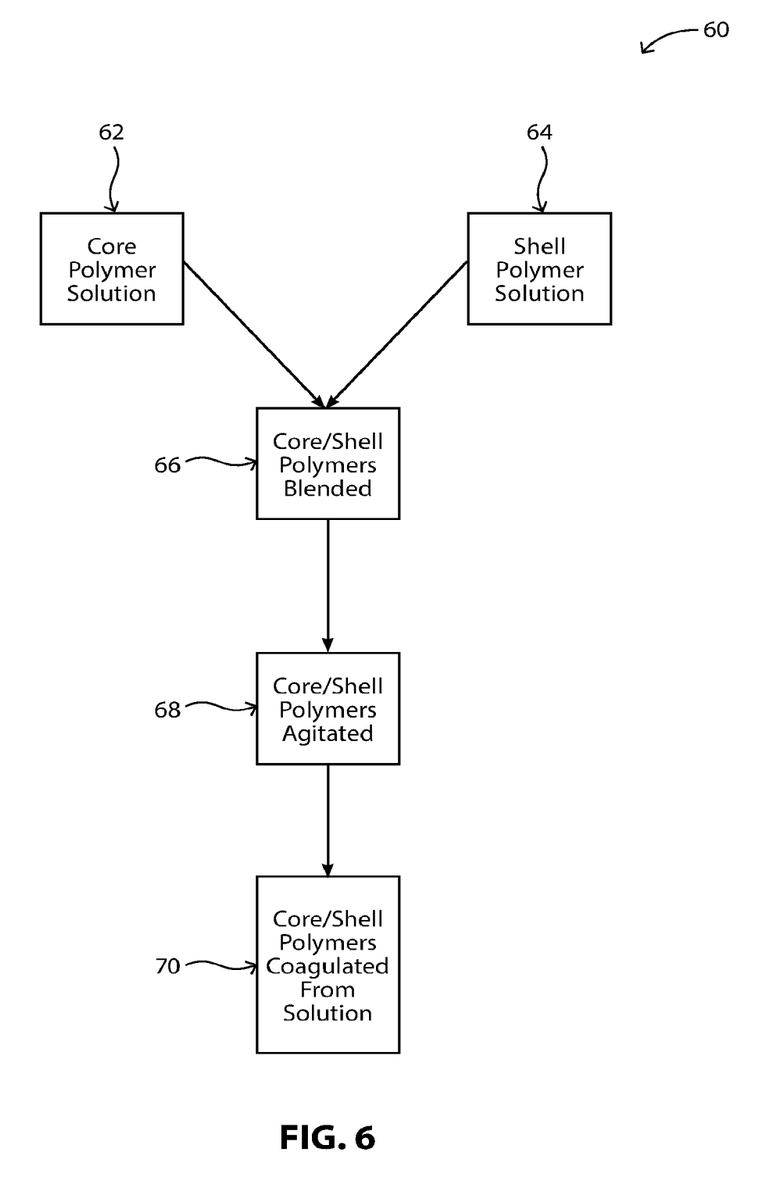
FIG. 6 is a flow chart depicting an illustrative process of making the core/shell pulverulent polymer.

An illustrative method of making such a core/shell polymer 60 is shown in FIG. 6. Method 60 includes placing the core polymer into a solution at 62. Such polymer may alternatively be placed in suspension or emulsion with the solvent. Suspending the core may be assisted by a surfactant. Further alternatively, the shell may be placed in a second solvent and added to the first solution. This will be mixed and the polymer will coagulate at the core-shell interface. The particular solvent type will be dependant on the polymer system. The relatively smaller quantity of shell polymer is added to a solvent at 64, which is then added to suspension/emulsion/solution 62 at 66. The composition may then be agitated at 68 to cause the shell material to adhere onto the core polymer particles. This is why miscibility may be a factor in determining which amorphous and semi-crystalline polymers are used. Such polymers with higher miscibility may tend to adhere to each other better than those that do not. It is believed that having amorphous polymer characteristics that are mismatched with semi-crystalline polymer characteristics may also make better core/shell combinations than combinations having similar material characteristics. The second solvent, with a polymer solvated into it at 64, coagulates and comes out of solution at 70.

A variety of other methods to chemically precipitate the above-identified polymers may be employed. One skilled in the art will appreciate, based on illustrative methods described herein, that other precipitation methods may be employed in the embodiments though they are not explicitly disclosed herein.

It is appreciated that these polymers may also be re-precipitated. It is further appreciated that different temperatures, pressures, times, and stir rates may be applied to these precipitation methods to modify the various characteristics of the polymers.

It is appreciated that the polymers may be mixed in different ratios and particle sizes. This may have the effect of changing or controlling the properties of the resulting pulverulent powdered polymer.

Particle-size distribution may be determined by laser scattering. Melting point and enthalpy may be determined through DSC. Powder flow may be measured using Method A of VIN EN ISO 6186. Modulus of elasticity and tensile strength may be determined pursuant the DIN/EN/ISO 527 standard.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A core/shell polymer material suitable for SLS-type three-dimensional printing, comprising:
    a core polymer comprising at least one amorphous powdered polymer;
    a shell material having a higher transition glass temperature than the at least one amorphous polymer core and surrounding the core particle comprising at least one semicrystalline polymer;
    wherein the core particle diffuses into the shell upon heating of the shell material above a Tg of the shell material to thereby lower the transition glass temperature of the shell material due to reacting with the at least one amorphous polymer core particle.

2. The core/shell polymer material of claim 1, wherein the at least one amorphous polymer as the core particle is selected from the group consisting at least one of acrylonitrile butadiene styrene (ABS), acrylonitrile styrene acrylate (ASA), polymethyl methacrylate (PMMA), Styrene-acrylonitrile resin (SAN), polyethylenimine (PEI), Polystyrene (PS), and polyethersulfone (PES).

3. The core/shell polymer material of claim 1, wherein the at least one amorphous polymer as the core particle is acrylonitrile butadiene styrene (ABS).

4. The core/shell polymer material of claim 1, wherein the at least one amorphous polymer as the core particle is acrylonitrile styrene acrylate (ASA).

5. The core/shell polymer material of claim 1, wherein the at least one amorphous polymer as the core particle is Styrene-acrylonitrile resin (SAN).

6. The core/shell polymer material of claim 1, wherein the at least one amorphous polymer as the core particle is polyethylenimine (PEI).

7. The core/shell polymer material of claim 1, wherein the at least one amorphous polymer as the core particle is polysulfone.

8. The core/shell polymer material of claim 1, wherein the at least one semicrystalline polymer as a shell material surrounding the core particle is selected from the group consisting at least one of polycarbonate (PC), polyetherether ketone (PEEK), polyphenylene Oxide (PPO), and polyphenylene sulfide (PPS).

9. The core/shell polymer material of claim 1, wherein the at least one semicrystalline polymer as a shell material surrounding the core particle is polyetherether ketone (PEEK).

10. The core/shell polymer material of claim 1, wherein the at least one semicrystalline polymer as a shell material surrounding the core particle is polyphenylene Oxide (PPO).

11. The core/shell polymer material of claim 1, wherein the core/shell further comprises an increased operating window where characteristics include a wider range between the melting and recrystallization temperatures, a larger enthalpy upon melting, and low volumetric change during recrystallization.

12. The core/shell polymer material of claim 1, wherein the core/shell particles soften at lower temperatures but do not react until exposed directly to the heat source.

13. The core/shell polymer material of claim 1, wherein the core/shell particles are sinterable from about room temperature to less than 150 degrees Celsius and do not suffer thermal degradation during the printing process.

14. The core/shell polymer material of claim 1, wherein the at least one amorphous polymer as the core particle composes the bulk of the core/shell particle.

15. The core/shell polymer material of claim 1, wherein the shell material holds the particle shape at an elevated temperature.

* * * * *